(12) United States Patent
Brinks

(10) Patent No.: US 12,452,508 B2
(45) Date of Patent: Oct. 21, 2025

(54) METHOD FOR PRODUCING A CAMERA, AND CAMERA

(71) Applicant: Robert Bosch GmbH, Stuttgart (DE)

(72) Inventor: Gerald Brinks, Waltenhofen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/703,798

(22) PCT Filed: Oct. 28, 2022

(86) PCT No.: PCT/EP2022/080165
§ 371 (c)(1),
(2) Date: Apr. 23, 2024

(87) PCT Pub. No.: WO2023/088658
PCT Pub. Date: May 25, 2023

(65) Prior Publication Data
US 2024/0422411 A1 Dec. 19, 2024

(30) Foreign Application Priority Data
Nov. 18, 2021 (DE) ............ 10 2021 212 985.4

(51) Int. Cl.
*H04N 23/51* (2023.01)
*G03B 30/00* (2021.01)

(52) U.S. Cl.
CPC .......... *H04N 23/51* (2023.01); *G03B 30/00* (2021.01)

(58) Field of Classification Search
CPC .................. H04N 23/51; G03B 30/00
(Continued)

(56) References Cited

U.S. PATENT DOCUMENTS 3,860,326 A * 1/1975 Frey ............. G03B 23/125
353/109
6,188,711 B1 * 2/2001 Corzine ............ H01S 5/0237
372/36
(Continued)

FOREIGN PATENT DOCUMENTS

DE 102014211879 A1 1/2016
DE 102018211309 A1 1/2020
(Continued)

OTHER PUBLICATIONS

International Search Report for PCT/EP2022/080165, Issued Mar. 6, 2023.

*Primary Examiner* — Matthew David Kim
(74) *Attorney, Agent, or Firm* — NORTON ROSE FULBRIGHT US LLP

(57) ABSTRACT

A method for producing a camera. The method includes: assembling a circuit carrier and a metal frame on a surface of the circuit carrier that carries an image sensor; optically measuring the circuit carrier assembly; introducing an objective with an objective housing into a camera housing, wherein the camera housing has a camera housing collar that extends into an interior of the camera housing and has a compression element arranged on a side facing the image sensor; fastening the objective housing to the camera housing; optically measuring the objective fastened to the camera housing; compressing the compression element depending on the optical measurements; arranging the circuit carrier assembly on the camera housing and aligning along two further coordinate axes and a further rotation axis; and connecting the circuit carrier assembly and the camera housing.

7 Claims, 5 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 6,456,766 | B1* | 9/2002 | Shaw | G02B 6/423 |
| | | | | 385/47 |
| 2002/0136554 | A1* | 9/2002 | Nomura | G03B 17/00 |
| | | | | 396/448 |
| 2009/0030299 | A1* | 1/2009 | Naito | A61B 3/165 |
| | | | | 600/399 |
| 2009/0097833 | A1* | 4/2009 | Imada | H04N 23/687 |
| | | | | 396/55 |
| 2013/0003065 | A1* | 1/2013 | Shah | H01S 3/0057 |
| | | | | 356/402 |
| 2014/0125824 | A1* | 5/2014 | Takizawa | G03B 17/561 |
| | | | | 348/208.3 |
| 2016/0014313 | A1* | 1/2016 | Müller | H04N 23/55 |
| | | | | 29/831 |
| 2018/0299622 | A1* | 10/2018 | Menard | G02B 6/3518 |
| 2021/0399357 | A1* | 12/2021 | Choi | H01M 10/643 |
| 2023/0128958 | A1* | 4/2023 | Lagatsky | H01S 3/1304 |
| | | | | 372/26 |
| 2023/0346224 | A1* | 11/2023 | Lavania | G01N 21/474 |

FOREIGN PATENT DOCUMENTS

| | | |
|---|---|---|
| DE | 102019216808 A1 | 5/2021 |
| KR | 20090020085 A | 2/2009 |
| WO | 2021069382 A1 | 4/2021 |

* cited by examiner

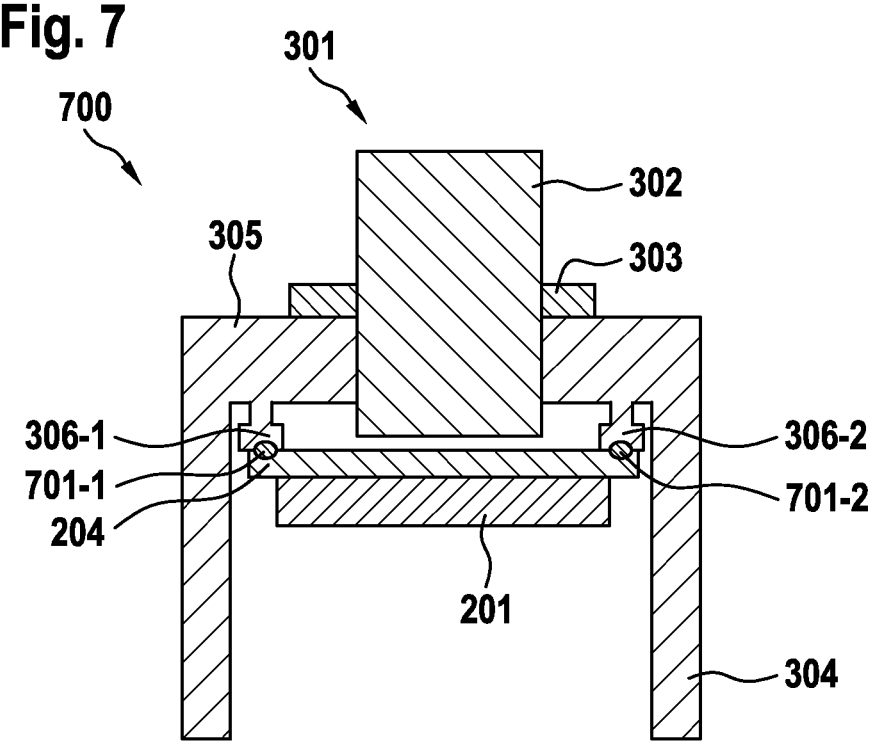

METHOD FOR PRODUCING A CAMERA, AND CAMERA

FIELD

The present invention relates to a method for producing a camera and to a camera.

BACKGROUND INFORMATION

In convention production methods for cameras, misalignments of optical axes can occur, which significantly worsen the detection of a vehicle environment by means of the camera. In order to avoid such misalignments, components of cameras can be aligned with one another during the production. For example, an objective axis, i.e., an axis of symmetry of an objective of a camera, can be aligned to coincide with a surface normal of a sensor surface that is perpendicular to the sensor surface. This can compensate for angular tilts of the objective axis with respect to the surface normal. The objective and the image sensor can have a common optical axis. The more precisely such an alignment takes place, the more reliably a corresponding camera can operate.

The angular tilts can result from connection tolerances and manufacturing tolerances in the production of a camera. A tolerance-related displacement or a tilt of individual optical lenses of the objective may also be a cause. This tilt is a variable that characterizes an objective and can be compensated again by a corresponding counter-tilt of the objective. Since an actual object is generally represented on an image surface, this tilt can be referred to as a so-called image surface tilt.

German Patent Application No. DE 10 2014 211 879 A1 describes a method for producing a camera, by means of which a compensation of such an image surface tilt can be made possible. The produced camera comprises a circuit carrier, an objective holder with lens tube and support pins, an image sensor mounted on the circuit carrier, and an objective accommodated in the objective holder, wherein the objective holder rests with its support pins on the image sensor surface or the circuit carrier. It is provided here that objective holders with different designs of the support pins are provided as objective holders of different classes or categories. Objectives are also classified or categorized on the basis of their specific image surface tilt. For an objective of a specific class, an objective holder of the class or category provided for this purpose is subsequently selected and used to form a camera.

SUMMARY

The present invention relates to a method for producing a camera. According to an example embodiment of the present invention, the method includes the steps of: assembling a circuit carrier and a metal frame on a surface of the circuit carrier that carries an image sensor, for providing a circuit carrier assembly; optically measuring the circuit carrier assembly for ascertaining a position of the image sensor on the circuit carrier; introducing an objective with an objective housing into a camera housing, wherein the camera housing has a camera housing collar that extends into an interior of the camera housing and has a compression element arranged on a side facing the image sensor; and fastening the objective housing to the camera housing; optically measuring the objective fastened to the camera housing, for ascertaining a focus and an image plane tilt of the objective; compressing the compression element depending on the optical measurement of the circuit carrier assembly and the optical measurement of the objective fastened to the camera housing, for adjusting an alignment of the objective with respect to the circuit carrier assembly to be arranged on the camera housing, along a first coordinate axis and along two rotation axes; arranging the circuit carrier assembly on the camera housing and aligning along two further coordinate axes and a further rotation axis; and connecting the circuit carrier assembly and the camera housing.

According to an example embodiment of the present invention, the camera produced by means of the method can in particular be used to detect an environment of a motor vehicle. The camera produced by means of the method can in particular be a vehicle camera. The circuit carrier is in particular designed as a circuit board. The objective can comprise one or more optical lenses arranged in an interior of the objective housing. The objective in particular has a cylindrical objective housing collar arranged on the objective housing. Fastening the objective housing to the camera housing can in particular take place such that the objective housing collar is fastened to the camera housing collar on a side facing the circuit carrier. The objective housing can thus be fastened to the camera housing collar. In particular, the objective housing collar and the camera housing collar are connected to one another.

The camera housing collar is in particular arranged on a side of the camera housing that faces the objective. The camera housing with the camera housing collar can be formed in one piece. The camera housing collar can alternatively be fastened, for example welded, to the camera housing. In other words, arranging the compression element on a side facing the image sensor means that the compression element is arranged on a side of the camera housing that faces the circuit carrier assembly. In other words, arranging the compression element on a side facing the image sensor means that the compression element is arranged on a side of the camera housing collar that faces away from the objective housing collar. The compression element can be designed in a variety of ways. The compression element is in particular designed as a compressible or compressed web that extends around the objective housing. Alternatively, the compression element in particular comprises three compressible or compressed pins arranged around the objective housing. In this case, three pins are advantageous since three points define a plane. A defined support of the circuit carrier assembly on the camera housing can thereby be made possible. The three pins can be arranged lying in a plane. The three pins can be arranged spaced apart 120 degrees.

According to an example embodiment of the present invention, arranging the circuit carrier assembly on the camera housing can take place such that the metal frame comes into contact with the compression element. Connecting the circuit carrier assembly and the camera housing can take place by means of laser welding, screwing, or even riveting. After connecting the circuit carrier assembly and the camera housing, a lid and/or a plug can furthermore be attached to the camera housing.

In the method according to an example embodiment of the present invention, the step of compressing the compression element can be regarded as the first alignment step, and the step of aligning the circuit carrier assembly can be regarded as the second alignment step. The first and the two further coordinate axes in particular form a Cartesian coordinate system. The first coordinate axis is in particular the axis that is parallel to the objective axis and/or to a surface normal of the image sensor. The first coordinate axis can be referred to as the Z axis. The two further coordinate axes are in particular in a plane spanned by the circuit carrier assembly. The two further coordinate axes can be referred to as the X axis and Y axis. The two rotation axes along which the alignment of the objective with respect to the circuit carrier assembly to be arranged on the camera housing is carried out coincide in particular with the two further coordinate axes. Accordingly, the two rotation axes can be referred to as the X rotation axis (in short: rotX) and Y rotation axis (in short: rotY). The further rotation axis coincides in particular with the first coordinate axis. Accordingly, the further rotation axis can be referred to as the Z rotation axis (in short: rotZ).

By means of the two alignment steps, a 6-axes alignment is made possible. By means of the two alignment steps, the objective and the image sensor can be aligned with respect to one another such that the image sensor is precisely arranged in the focus of the objective. The latter is in particular achieved through the alignment along the first coordinate axis. By means of the two alignment steps, the objective and the image sensor can also be aligned with respect to one another such that an image plane tilt or image surface tilt of the objective is compensated. This is in particular achieved through the alignment along the two rotation axes. By aligning along the two further coordinate axes, the objective can be arranged centrally in relation to the image sensor. The circuit carrier assembly can be precisely aligned with respect to the camera housing. The objective axis can coincide with the surface normal of the image sensor. The objective and the image sensor can have a common optical axis. The alignment along the third rotation axis allows a precise adjustment of a roll angle of a vehicle camera.

An advantage of the present invention is, on the one hand, that the use of adhesive in the production of the camera, in particular in the alignment steps, can be avoided. Costs for the production process can thereby be reduced since laborious metering and application devices for adhesives are avoided. Drying times for adhesive joints are avoided, and the production process is thus accelerated. Changes in the optical properties of the camera, for example due to temperature changes, moisture or over the service life of the camera, are avoided, as have been found to occur in known cameras having adhesive joints. In addition, compressing the compression element makes it possible to customize the camera housing depending on the optical measurement of the circuit carrier assembly and the optical measurement of the objective fastened to the camera housing. In comparison to providing different classes or categories of objective holders with different designs of the support pins, as, for example, described in DE 10 2014 211 879 A1, the method presented here can be somewhat more time-consuming. However, precisely through this customization, it is possible to produce cameras with very high sharpness requirements (depth of field <15-20 μm). Conventional other cameras, which, for example, also have adhesive joints, cannot ensure such sharpness requirements or cannot ensure them constantly over the entire service life of a camera. The optical properties of the cameras produced according to the described method are constant over a long service life. A long-lasting camera with very low depths of field is realized, which both precisely combines the optical axes of the image sensor and the objective and keeps the image sensor precisely in the focus of the objective. By connecting the circuit carrier assembly and the camera housing by means of laser welding, a camera can also be connected together in a metal-sealed manner. This makes the camera less prone to unwanted changes in the optical properties over the service life. The image sensor can also be protected from external influences.

In an advantageous embodiment of the present invention, it is provided that, in the optical measurement of the circuit carrier assembly, a distance of a sensitive surface of the image sensor from the surface of the circuit carrier and/or a surface normal of the image sensor is ascertained. In particular, a plane of the sensitive surface is measured in relation to reference surfaces of the circuit carrier assembly. In particular, a plane of the sensitive surface is measured in relation to the metal frame of the circuit carrier assembly. The advantage of this embodiment is that compressing the compression element takes place even more precisely. Customizing the camera housing takes place even more precisely, and a camera with very low depth of field can be realized.

In a further advantageous embodiment of the present invention, it is provided that, in the step of compressing, the compression element is compressed at three different locations, and wherein, at the three different locations, compressing takes place at the same and/or different pressures or with the same and/or different paths. The compression element can in particular be compressed by means of a planar plate. A path of the plate can be used as a guide variable for the compression. The pressure and/or the path with which each location is pressed is in particular dependent on the optical measurement. If, for example, an alignment of the objective with respect to the circuit carrier assembly to be arranged on the camera housing is necessary, i.e., angular errors were ascertained in the optical measurements, the paths at the three locations can be different. If, on the other hand, no angular errors were ascertained in the optical measurements, the paths at the three locations can be the same. The advantage of this embodiment is that the first alignment step can take place very precisely. In particular, the corrections of the deviations of the alignment of the objective along the first coordinate axis and along the two rotation axes can take place very precisely.

In a further advantageous embodiment of the present invention, it is provided that the objective is introduced into the camera housing such that an axis of symmetry of the camera housing and an optical axis of the objective coincide. First, the objective is inserted into the camera housing in a suitable rotational position (azimuth angle). The advantage of this embodiment is that angular tilts as a result of connection tolerances and manufacturing tolerances are thereby kept low or avoided.

In a further advantageous embodiment of the present invention, it is provided that fastening the objective housing to the camera housing takes place by means of laser welding or by means of a screw connection. The advantage of this embodiment is that this fastening location also does not require any adhesive. Changes in the optical properties of the camera, for example due to temperature changes, moisture or over the service life, can be avoided even better. The costs of the production process can be further reduced. The camera housing and the objective housing can also be connected to one another in a metal-sealed manner. This is in particular the case when fastening by means of laser welding. This makes the camera less prone to unwanted changes in the optical properties over the service life.

In a further advantageous embodiment of the present invention, it is provided that assembling the circuit carrier with the metal frame takes place by riveting or screwing. The advantage of this example embodiment is that a stable circuit carrier assembly can be provided. By means of the direct metal contact between the circuit carrier and the frame, a good thermal connection of the electronics can take place. This can significantly reduce the temperature of the image sensor. The use of adhesive can also be avoided here.

The present invention furthermore proceeds from a computer program configured to perform all steps of the above-described method.

The present invention furthermore proceeds from a camera produced according to the described method of the present invention and comprising a camera housing with a camera housing collar extending into an interior of the camera housing, wherein a compression element is arranged on a side of the camera housing collar that faces an image sensor; an objective introduced into the camera housing, wherein an objective housing of the objective is fastened to the camera housing; and a circuit carrier assembly with a circuit carrier, the image sensor, and a metal frame, which is arranged on a surface of the circuit carrier that carries the image sensor. Here, the circuit carrier assembly and the camera housing are connected to one another by means of laser weld joints. In particular, the circuit carrier assembly is arranged on the camera housing such that the metal frame is in contact with the compression element. In particular, the metal frame and the compression element are connected to one another by means of laser weld joints. The compression element is in particular compressed or compressible.

In an advantageous embodiment of the present invention, it is provided that the metal frame is formed from aluminum. The advantage of this embodiment is that the metal frame has a spring effect in the direction of the fastening points to the circuit carrier. The aluminum metal frame also compensates for temperature-related expansions of the camera housing. This prevents the circuit carrier from bending. Rising or sinking of the circuit carrier, and of the image sensor with it, in the case of temperature changes or over time is prevented. The alignment of objective and image sensor is kept stable.

In a further advantageous embodiment of the present invention, it is provided that the compression element is designed as a compressible or compressed web extending around the objective housing, or that the compression element comprises three compressible or compressed pins arranged around the objective housing. The three pins can be arranged lying in a plane.

It is understood that the aforementioned features and the features yet to be explained below can be used not only in the respectively specified combination but also in other combinations, or alone, without departing from the scope of the present invention.

BRIEF DESCRIPTION OF THE DRAWINGS

Exemplary embodiments of the present invention are explained in more detail below with reference to the figures. Identical reference signs in the figures denote identical or functionally identical features.

FIG. 7 an exemplary embodiment of a camera, according to the present invention.

DETAILED DESCRIPTION OF EXAMPLE EMBODIMENTS

Figure 1:
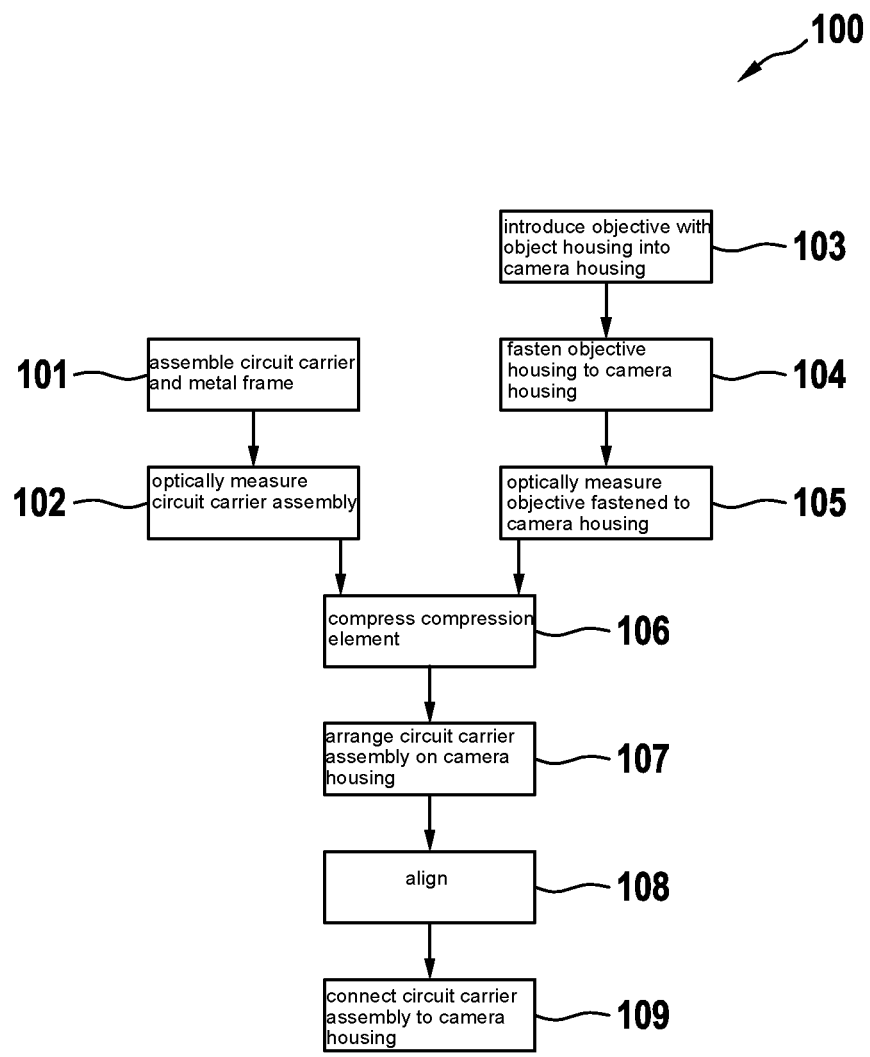
FIG. 1 shows an exemplary embodiment of the method for producing a camera, according to the present invention.

FIG. 1 shows an exemplary embodiment of the method 100 for producing a camera. In step 101, a circuit carrier and a metal frame are assembled on the surface of the circuit carrier that carries an image sensor. A circuit carrier assembly is thereby provided. In step 102, the circuit carrier assembly is optically measured in order to ascertain a position of the image sensor on the circuit carrier. In step 103, an objective with an objective housing is introduced into a camera housing, wherein the camera housing has a camera housing collar that extends into an interior of the camera housing and has a compression element arranged on a side facing the image sensor. In step 104, the objective housing is fastened to the camera housing. In step 105, the objective fastened to the camera housing is optically measured in order to ascertain a focus and an image plane tilt of the objective. The results of the two optical measurements from steps 102 and 105 are subsequently used in step 106. In step 106, the compression element is compressed depending on the optical measurement of the circuit carrier assembly and the optical measurement of the objective fastened to the camera housing. As a result, an alignment of the objective with respect to the circuit carrier assembly to be arranged on the camera housing, along a first coordinate axis and along two rotation axes is adjusted. In step 107, the circuit carrier assembly is arranged on the camera housing and, in step 108, is aligned along two further coordinate axes and a further rotation axis. In step 109, the circuit carrier assembly and the camera housing are connected to one another. After connecting the circuit carrier assembly and the camera housing, a lid and/or a plug can be attached to the camera housing in an optional step not shown here.

The following FIGS. 2A to 7 show further details of individual method steps, individual components of the camera, or the camera as such. In the examples shown here, the compression element comprises three compressible or compressed pins arranged around the objective housing. The statements are also analogously applicable to method steps or a camera, in which the compression element is designed differently, for example in the manner of a compressible or compressed web extending around the objective housing, or in another geometry.

Figure 2A:
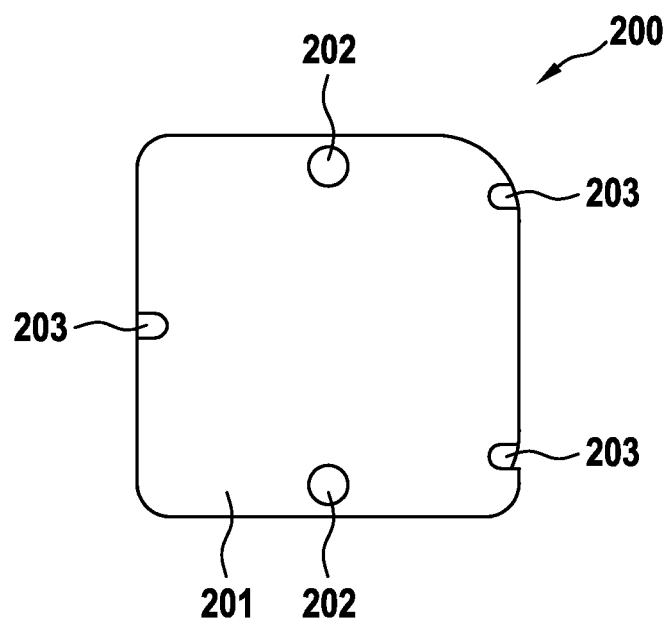
FIGS. 2A and 2B show an exemplary embodiment of a circuit carrier assembly, according to the present invention.
Figure 2B:
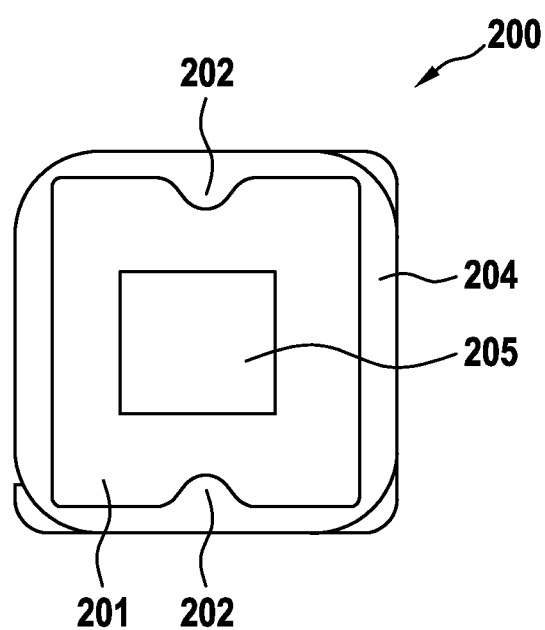

FIGS. 2A and 2B show an exemplary embodiment of a circuit carrier assembly 200. FIG. 2A shows a plug side of the circuit carrier assembly 200, and FIG. 2B shows an image sensor side of the circuit carrier assembly 200. On the plug side of the circuit carrier assembly 200, the two locations 202 can be seen, where, for example, the metal frame 204 and the circuit carrier 201 are being or have been assembled by means of rivets or screws. Furthermore, the three locations 203 can be seen, where the circuit carrier assembly 200 can be welded to the camera housing in step 109 of the above-described method 100. On the image sensor side of the circuit carrier assembly 200 in FIG. 2B, not only the circuit carrier 201 and the image sensor 205 but also the metal frame 204 can be seen. In the example shown here, the metal frame 204 uniformly frames the circuit carrier 201, wherein, at the two locations 202, where the metal frame 204 is being or has been assembled with the circuit carrier 201, the metal frame has indentations aligned with respect to the image sensor 205. The metal frame 204 can be formed from aluminum.

Figure 3:
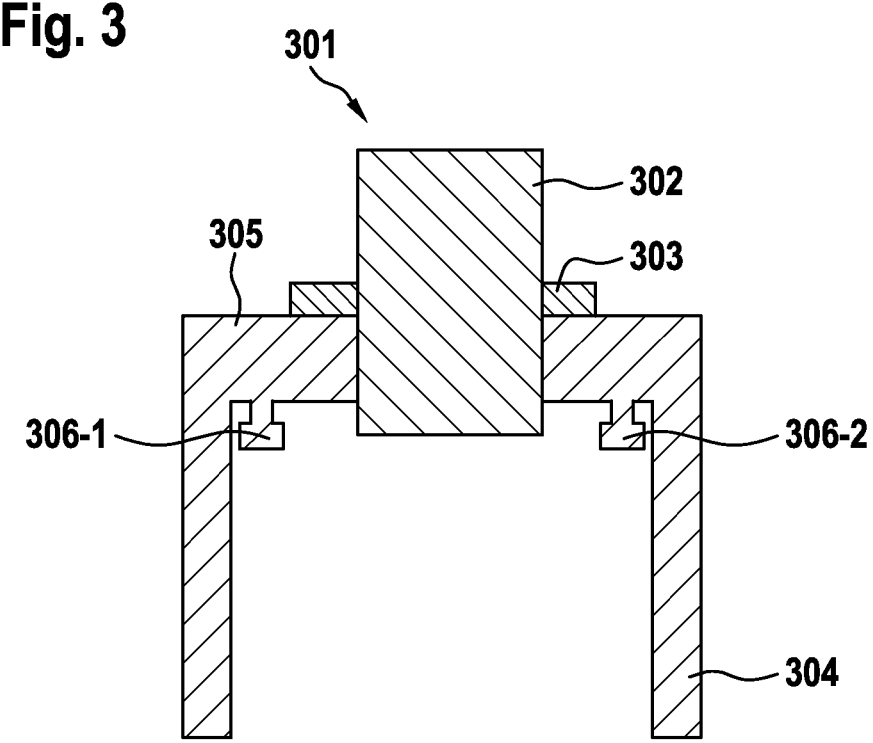
FIG. 3 shows a sectional view of an exemplary embodiment of an objective fastened to a camera housing, according to the present invention.

FIG. 3 shows a sectional view of an exemplary embodiment of an objective 301 fastened to a camera housing 304, i.e., the method 100 after step 104. The objective 301 and the camera housing 304 can have been fastened to one another by means of a laser weld joint or by means of a screw connection. FIG. 3 shows that the camera housing 304 has a camera housing collar 305 extending into an interior of the camera housing 304. The objective 301 comprises the objective housing 302 and the cylindrical objective housing collar arranged on the objective housing 302. The objective 301 and the camera housing 304 are fastened to one another such that the objective housing collar 303 is fastened to the camera housing collar 305 on a side facing the circuit carrier 201. Furthermore, the pins 306-1 and 306-2 can be seen on the side of the camera housing collar 305 that faces away from the objective housing collar 303. Due to the sectional view, the third pin arranged on the camera housing collar 305 cannot be seen in FIG. 3. The three pins can be seen better in FIG. 4.

Figure 4:
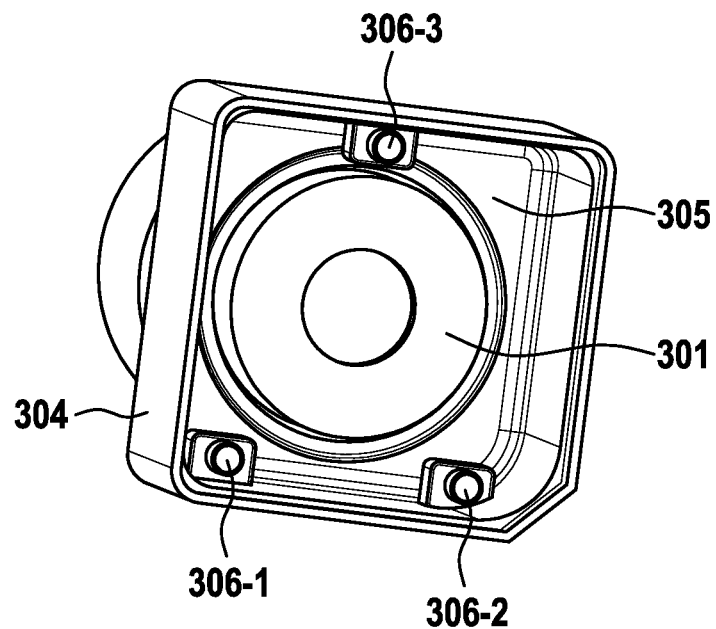
FIG. 4 shows a bottom view of an exemplary embodiment of an objective fastened to a camera housing, according to the present invention.

FIG. 4 shows a bottom view of an exemplary embodiment of an objective 301 fastened to a camera housing 304. Here, the three pins 306-1, 306-2, and 306-3 are arranged on a side of the camera housing collar 305 that faces away from the objective housing collar 303. The three pins 306-1, 306-2, and 306-3 can be compressed in step 106 of the above-described method 100 depending on the optical measurements from steps 102 and 105. A first correction of the deviations of the alignment of the objective 301 can take place along a first coordinate axis Z (shown, for example, in FIG. 5) and along a first and a second rotation axis, here X rotation axis rotX and Y rotation axis rotY. The three pins 306-1, 306-2, and 306-3 can be compressed at the same and/or different pressures.

Figure 5:
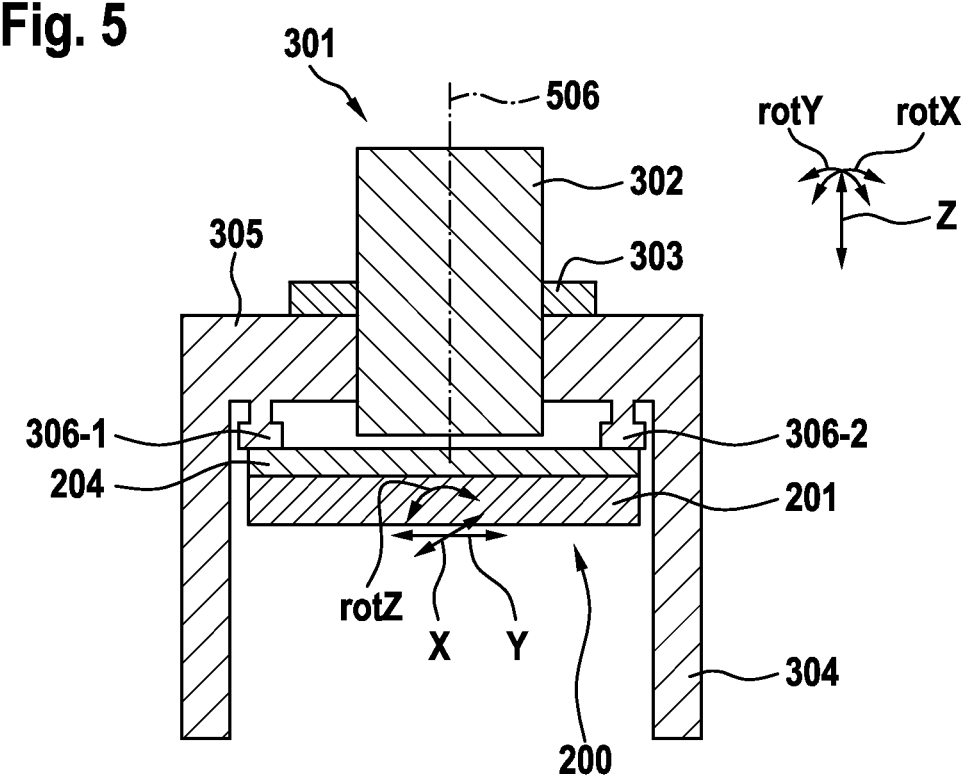
FIG. 5 shows a sectional view of a representation of arranging the circuit carrier assembly on the camera housing, according to the present invention.

FIG. 5 shows a sectional view of a representation of arranging 107 the circuit carrier assembly 200 on the camera housing 304 and aligning 108. The circuit carrier assembly 200 consisting of the circuit carrier 201 and the metal frame 204 is arranged on the camera housing 304 such that the metal frame 204 comes into contact with the pins, the pin 306-1 and the pin 306-2 being shown here. In step 108, the circuit carrier assembly 200 is aligned along two further coordinate axes, here the X axis and Y axis, and along a further rotation axis, here the Z rotation axis rotZ.

By means of the two steps 106 and 108, the objective 301 and the image sensor 205 can be aligned with respect to one another such that errors of all six space axes are compensated. As a result, the objective 301 and the image sensor 205 can have a common optical axis 506.

Figure 6:
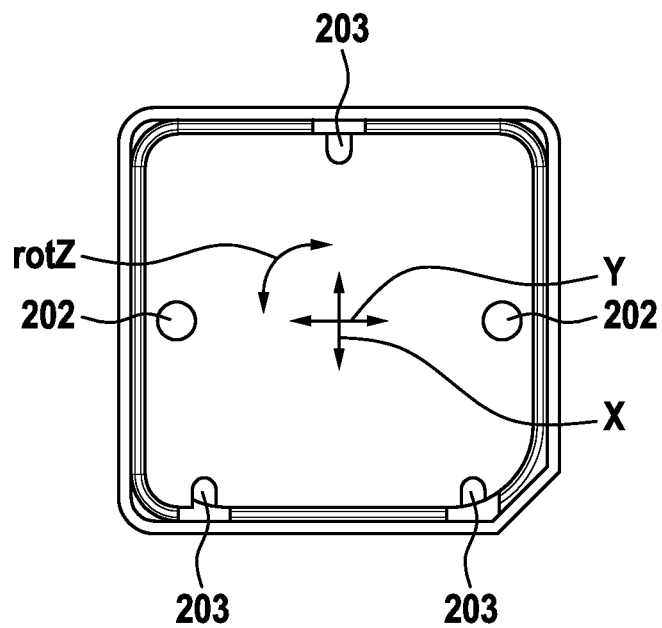
FIG. 6 shows a bottom view of a representation of arranging and aligning the circuit carrier assembly on the camera housing, according to the present invention.

FIG. 6 shows a bottom view of a representation of aligning 108 the circuit carrier assembly on the camera housing. Here, the two further coordinate axes X and Y as well as the further rotation axis rotZ can be seen once again in more detail.

FIG. 7 shows an exemplary embodiment of a camera 700. The camera 700 can have been produced by means of the above-described method 100. The camera 700 comprises a circuit carrier assembly with a circuit carrier 201 and a metal frame 204, which is arranged on a side of the circuit carrier 201 that carries an image sensor. The camera 700 furthermore comprises a camera housing 304 with a camera housing collar 305 extending into an interior of the camera housing 304, wherein a compression element, here the three compressible or compressed pins 306-1 and 306-2, is arranged on a side of the camera housing collar 305 that faces the circuit carrier assembly. The circuit carrier assembly is arranged on the camera housing 304 such that the metal frame 204 is in contact with the three pins. The circuit carrier assembly and the camera housing 304 are connected by means of the laser weld joints 701-1, 702-2. The laser weld joints 701-1, 702-2 are in particular arranged at the locations 203 shown in FIG. 2. The laser weld joints 701-1, 702-2 can thus be regarded as connection points of the circuit carrier assembly with the compression element, here the three pins 306-1 to 306-3, of the camera housing 304. The camera 700 furthermore comprises an objective 301 with an objective housing 302 and a cylindrical objective housing collar 303 arranged on the objective housing 302. The objective housing collar 303 is arranged on the camera housing collar 305 on a side facing the circuit carrier 201.

The invention claimed is:

1. A method for producing a camera, comprising the following steps:
    assembling a circuit carrier and a metal frame on a surface of the circuit carrier that carries an image sensor to provide a circuit carrier assembly;
    optically measuring the circuit carrier assembly for ascertaining a position of the image sensor on the circuit carrier;
    introducing an objective with an objective housing into a camera housing, wherein the camera housing has a camera housing collar that extends into an interior of the camera housing and has a compression element arranged on a side facing the image sensor, and fastening the objective housing to the camera housing;
    optically measuring the objective fastened to the camera housing to ascertain a focus and an image plane tilt of the objective;
    compressing the compression element depending on the optical measurement of the circuit carrier assembly and the optical measurement of the objective fastened to the camera housing to adjust an alignment of the objective with respect to the circuit carrier assembly to be arranged on the camera housing, along a first coordinate axis and along two rotation axes;
    arranging the circuit carrier assembly on the camera housing and aligning along two further coordinate axes and a further rotation axis; and
    connecting the circuit carrier assembly and the camera housing.

2. The method according to claim 1, wherein, in the optical measurement of the circuit carrier assembly, a distance of a sensitive surface of the image sensor from the surface of the circuit carrier and/or a surface normal of the image sensor is ascertained.

3. The method according to claim 1, wherein, in the step of compressing, the compression element is compressed at three different locations, and wherein, at the three different locations, compressing takes place: (i) at the same and/or different pressures, or (ii) with the same and/or different paths.

4. The method according to claim 1, wherein the objective is introduced into the camera housing such that an axis of symmetry of the camera housing and an optical axis of the objective coincide.

5. The method according to claim 1, wherein the fastening of the objective housing to the camera housing takes place by laser welding or by a screw connection.

6. The method according to claim 1, wherein the assembling of the circuit carrier with the metal frame takes place by riveting or screwing.

7. A non-transitory computer-readable medium on which is stored a computer program for producing a camera, the computer program, when executed by a computer, causing the computer to perform the following steps:

assembling a circuit carrier and a metal frame on a surface of the circuit carrier that carries an image sensor to provide a circuit carrier assembly;

optically measuring the circuit carrier assembly for ascertaining a position of the image sensor on the circuit carrier;

introducing an objective with an objective housing into a camera housing, wherein the camera housing has a camera housing collar that extends into an interior of the camera housing and has a compression element arranged on a side facing the image sensor, and fastening the objective housing to the camera housing;

optically measuring the objective fastened to the camera housing to ascertain a focus and an image plane tilt of the objective;

compressing the compression element depending on the optical measurement of the circuit carrier assembly and the optical measurement of the objective fastened to the camera housing to adjust an alignment of the objective with respect to the circuit carrier assembly to be arranged on the camera housing, along a first coordinate axis and along two rotation axes;

arranging the circuit carrier assembly on the camera housing and aligning along two further coordinate axes and a further rotation axis; and connecting the circuit carrier assembly and the camera housing.

* * * * *